(12) United States Patent
VanLuik et al.

(10) Patent No.: US 7,459,817 B2
(45) Date of Patent: Dec. 2, 2008

(54) SEMI-ENCLOSED AC MOTOR

(75) Inventors: Robert V. VanLuik, Pittsburgh, PA (US); Eric Prosser, Pittsburgh, PA (US); Edward T. Deitt, Orlando, FL (US)

(73) Assignee: Bombardier Transportation GmbH, Berlin (DE)

( * ) Notice: Subject to any disclaimer, the term of this patent is extended or adjusted under 35 U.S.C. 154(b) by 323 days.

(21) Appl. No.: 11/504,121

(22) Filed: Aug. 15, 2006

(65) Prior Publication Data

US 2008/0042502 A1 Feb. 21, 2008

(51) Int. Cl.
*H02K 5/00* (2006.01)
*H02K 9/00* (2006.01)

(52) U.S. Cl. .............................. 310/89; 310/58; 310/43; 310/90; 310/258

(58) Field of Classification Search .................... 310/43, 310/58–59, 62–63, 89, 90, 259, 260
See application file for complete search history.

(56) References Cited

U.S. PATENT DOCUMENTS

| | | | |
|---|---|---|---|
| 3,749,953 A * | 7/1973 | Baumann et al. .............. 310/62 |
| 4,381,464 A | 4/1983 | Schnyder | |
| 4,546,279 A * | 10/1985 | Hammer et al. ............... 310/59 |
| 4,670,677 A * | 6/1987 | Snider et al. ................... 310/63 |
| 5,331,238 A * | 7/1994 | Johnsen ........................ 310/58 |
| 5,440,184 A * | 8/1995 | Samy et al. .................... 310/90 |
| 5,670,838 A * | 9/1997 | Everton ........................ 310/254 |
| 5,877,576 A * | 3/1999 | CoChimin ................... 310/254 |
| 5,939,805 A * | 8/1999 | Vanduyn ....................... 310/58 |
| 5,998,896 A | 12/1999 | Early et al. | |
| 6,731,036 B2 | 5/2004 | Ghiotto | |
| 6,765,325 B1 | 7/2004 | Prouvost | |
| 6,891,290 B2 | 5/2005 | Nagayama et al. | |

* cited by examiner

*Primary Examiner*—Thanh Lam
(74) *Attorney, Agent, or Firm*—The Webb Law Firm

(57) ABSTRACT

A partially enclosed induction motor comprises a rotor assembly, a stator assembly, and a metal frame defining a housing having a generally cylindrical shape with bearing housings at each axial end. The interior of the frame is configured to closely embrace a laminated core and follows the contour of the coil end turns of the stator assembly. A canister seal between the stator assembly and the rotor assembly hermetically seals the rotor assembly from the stator assembly. A heat conductive molding material fills gaps in the stator winding and the space between the stator assembly and the frame. A fan driven by the rotor shaft and a shroud direct the air along the canister seal and through the rotor assembly.

8 Claims, 12 Drawing Sheets

SERIES FLOW

SERIES FLOW

DUAL FAN

PARALLEL FLOW

MIXED FLOW

SEMI-ENCLOSED AC MOTOR

BACKGROUND OF THE INVENTION

Field of the Invention

The present invention relates to traction motors used in the railway industry and, more specifically, to a semi or partially enclosed motor in which the rotor assembly is cooled by a fan drawing air into the rotor and a stator assembly which is molded into and totally enclosed by a stator housing.

Totally Enclosed Fan Cooled (TEFC) motors have been used in industry for many years as low maintenance, rain, and snow tolerant motors. They are sealed to the outside environment by the enclosure so that dust, dirt, and water cannot enter the motor and damage the insulation. There is no mixing of external air and internal air in a conventional TEFC motor. They are commonly available in industrial applications. Recently, TEFC motors have been introduced for use on trains where power density is pushed to the maximum.

A TEFC motor is defined as a motor completely surrounded by a sealed enclosure (frame) over the current carrying and heat generating parts of the machine. The enclosure surrounds both the stator, rotor, and bearings. There is an internal air gap between the rotor assembly plus stator coils and the enclosure walls. Heat flows from the rotating rotor assembly into the internal air, which is usually agitated by an internal fan, and then out through the shaft or into the enclosure walls. The stator heat flows from the stationary coils which are hanging in semi-stagnant air, back into the stator's steel core and out into the enclosure. An external fan blows air over the enclosure (frame) to cool it. The enclosure has no openings to the outside and outside air does not mix with internal air.

A Forced Cooled motor is cooled by external air blowing through the motor interior and directly over the stator and rotor surfaces. External air is mixed with internal air.

A Self-Cooled motor is similar to a Forced Cooled motor except that the air flow is generated by an internal fan mounted on the shaft.

All heat generated by the TEFC motor must pass through the enclosure walls. Heat resulting from rotor and stator losses is trapped inside the machine and, therefore, problems have been experienced with hot rotors, stators, and bearings.

TEFC motor losses must be minimized and this is accomplished by adding more iron and copper to the design for any given power capacity (KW). TEFC motors are, therefore, large when compared to forced or self-cooled machines of the same rating. Space for motors is severely limited on trains and weight has an adverse effect on performance of the train. Present TEFC motors are heavier and larger than other forced cooled and self-cooled technologies.

Forced Cooled and Self-Cooled motors allow dirty wet air to enter the enclosure and impinge on the insulated stator coil surfaces. The ingestion of dust, dirt, or moisture can damage the insulation on the stator coils. Cracks forming in the insulation layers and the introduction of moisture, dirt, and ice leads to ground failures.

Previous attempts to produce a smaller, lighter, TEFC motor have been concentrated on improving the heat transfer rates from the rotor, through the agitated internal air, and into the enclosure walls or by dissipating more heat from the enclosure walls.

SUMMARY OF THE INVENTION

Briefly, according to the present invention, there is provided a partially enclosed induction motor. The motor comprises a cylindrical metal rotor assembly having an integral shaft and typical squirrel cage. The rotor assembly has axial cooling air passages extending end to end. A stator assembly surrounds the rotor assembly. The stator assembly has a generally cylindrical laminated iron core with axial slots for receiving straight sections of stator windings. The stator windings have end turns extending axially beyond the laminated core. The stator assembly has approximate rotational symmetry about the axis of the rotor. A metal frame defines a housing having a generally cylindrical shape with bearing housings attached or mounted to the frame at each axial end such that bearings in the bearing housing support the shaft of the rotor assembly and establish the rotation axis of the rotor assembly. The interior of the frame is configured to closely embrace the laminated core and follows the contour of the end turns of the stator assembly.

A canister seal is positioned between the stator assembly and the rotor assembly for hermetically sealing the rotor assembly from the stator assembly. A heat conductive molding material fills the gaps in the stator winding and the space between the stator assembly and the frame.

According to a first embodiment, the frame is formed as two castings that when assembled together form an approximately rotationally symmetric interior closely embracing the iron core and winding coils.

According to a second embodiment, the frame is formed of two machined extrusions with two attached disk-shaped axial end plates to form an approximately rotationally symmetric interior closely embracing the iron core and follows the contour of the winding coils.

According to a third embodiment, the frame is formed of a casting, two end wedges, and two split rings assembled to form an approximately rotationally symmetric interior closely embracing the iron core and follows the contours of the winding coils.

A fan is driven by the rotor shaft and a fan shroud directs the air expelled by the fan along the canister seal and through the rotor assembly. Thus, the encapsulated stator assembly is cooled both from inside and outside the enclosure surfaces without exposing the windings to the atmosphere, which can result in deterioration of the insulation on the windings.

According to a preferred embodiment, the metal frame is formed as two semi-cylindrical shapes that, when assembled together, form the metal frame. In this way, the interior of the frame can be formed to closely fit over the stator assembly and follows the contour of the winding coils. Preferably, the metal frame has longitudinal and radial fins on the exterior surface and is an iron, steel or aluminum casting.

According to a preferred embodiment, the heat conductive molding material associated with the stator winding is a resin with heat conductive filler. Most preferably, the molding material is comprised of a first non-flexible layer filling the gaps between and encasing the windings and a second non-hygroscopic layer wherein the molding material tightly packs the space between the stator assembly and the frame to assure maximum heat transfer. Most preferably, the molding material is a silicone resin, epoxy resin, thermo-plastic or ceramic cement.

According to a further preferred embodiment, a second fan driven by the rotor and a shroud associated with it directs air through the fins on the exterior of the frame.

BRIEF DESCRIPTION OF THE DRAWINGS

Other objects and features of the invention will appear in the course of the description thereof which follows.

DESCRIPTION OF THE PREFERRED EMBODIMENTS

Figure 1:
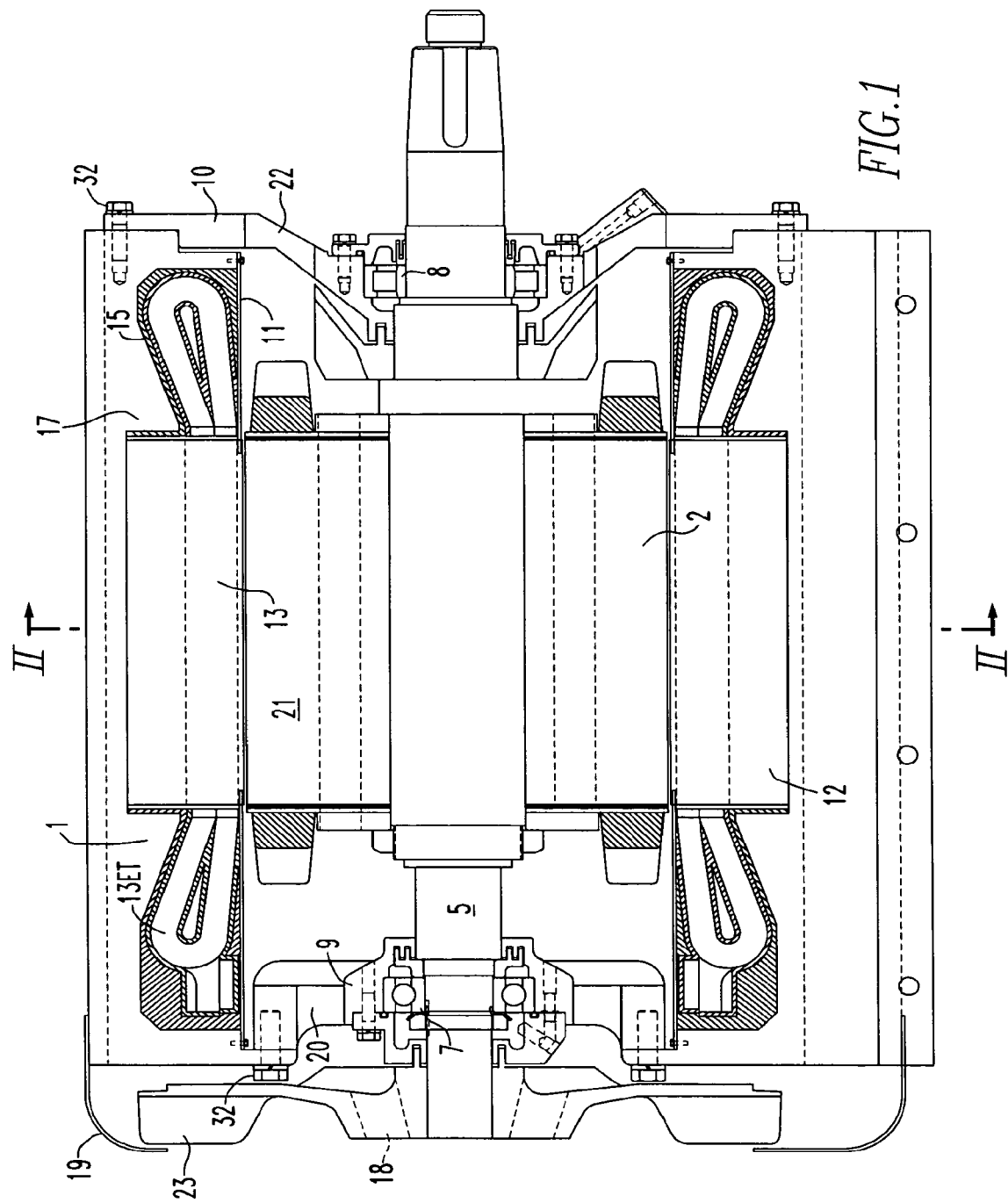
FIG. 1 is an axial, longitudinal cross-sectional view of a first embodiment of the present invention taken along line I-I in FIG. 2.
Figure 2:
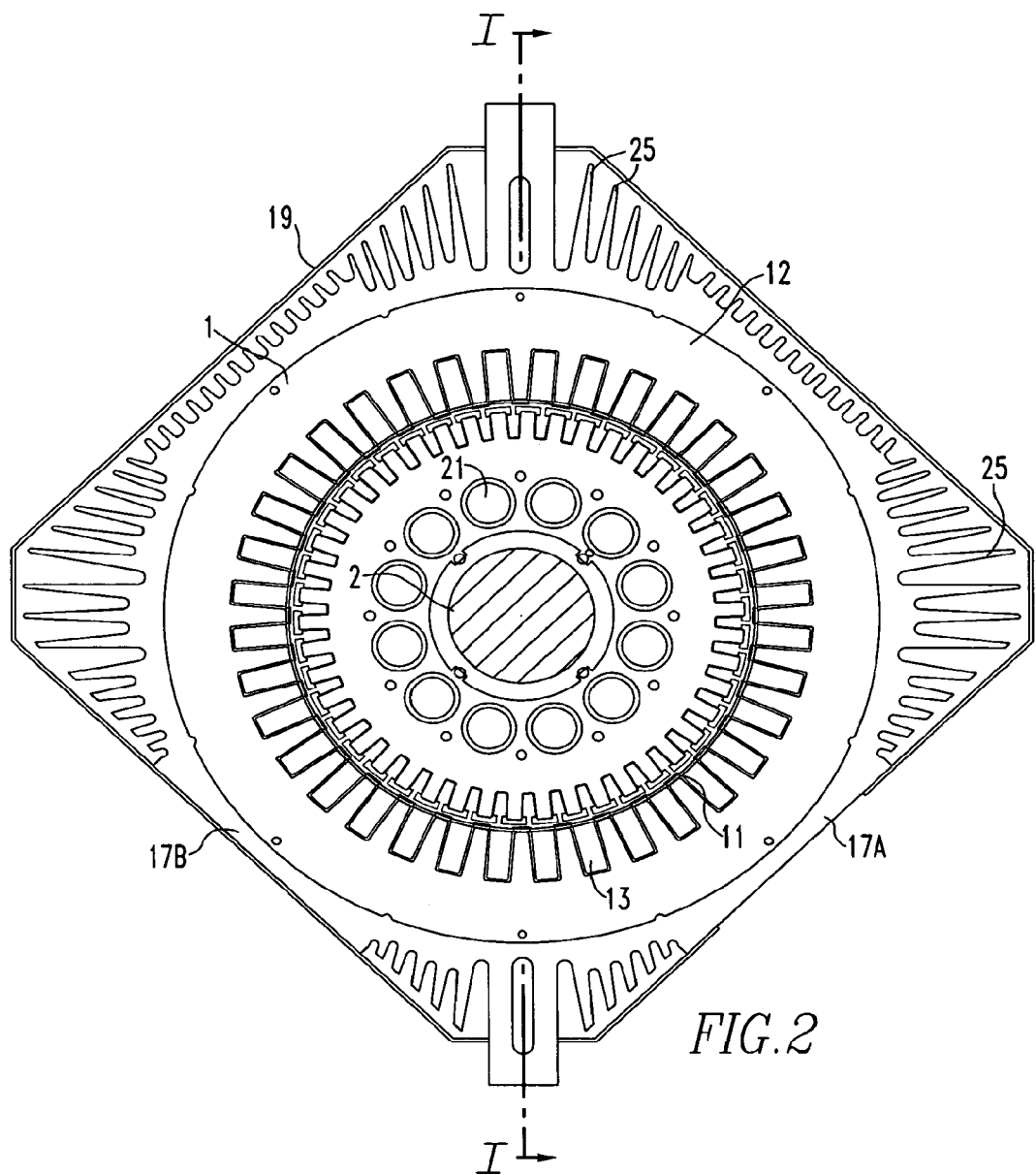
FIG. 2 is a cross-sectional view taken along line II-II in FIG. 1 perpendicular to the rotor axis through the center of the motor.
Figure 3:
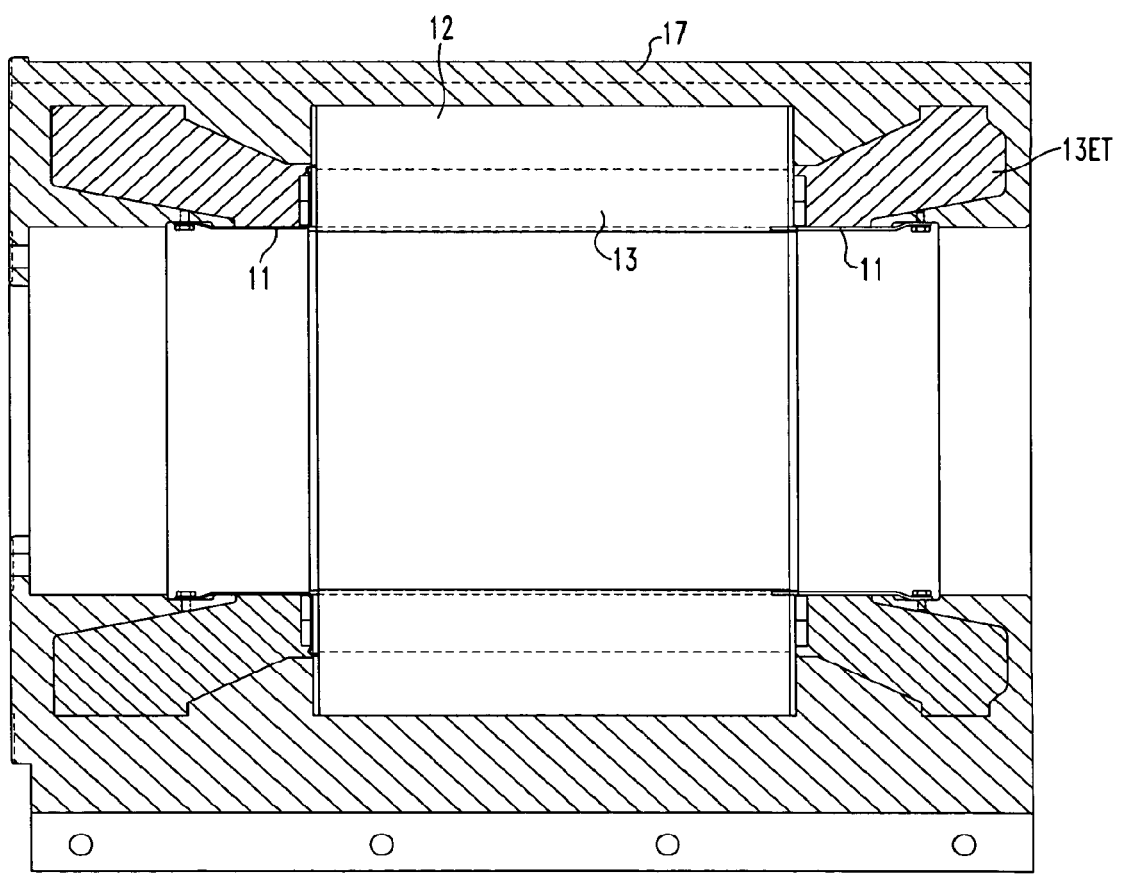
FIG. 3 is a section view taken along line I-I of FIG. 2.
Figure 4:
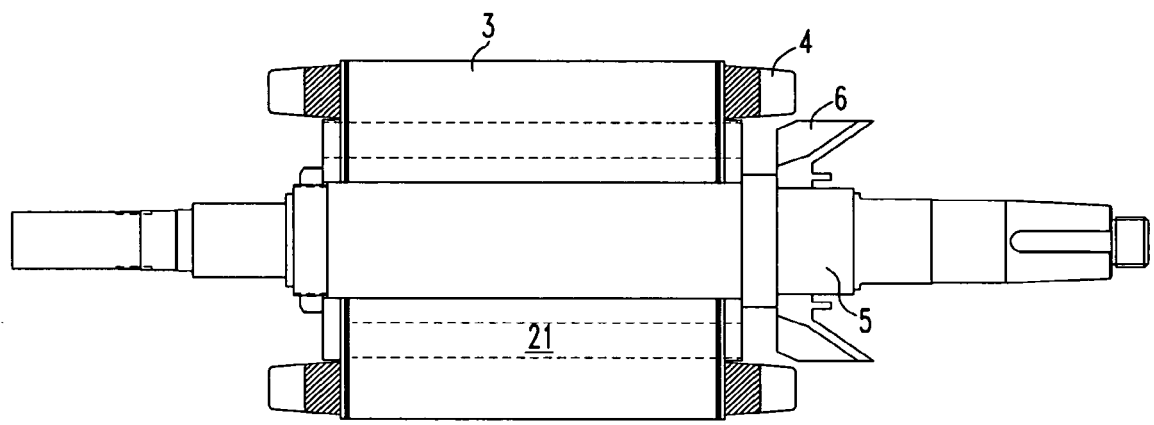
FIG. 4 is a view of the rotor assembly of FIG. 1.
Figure 5:
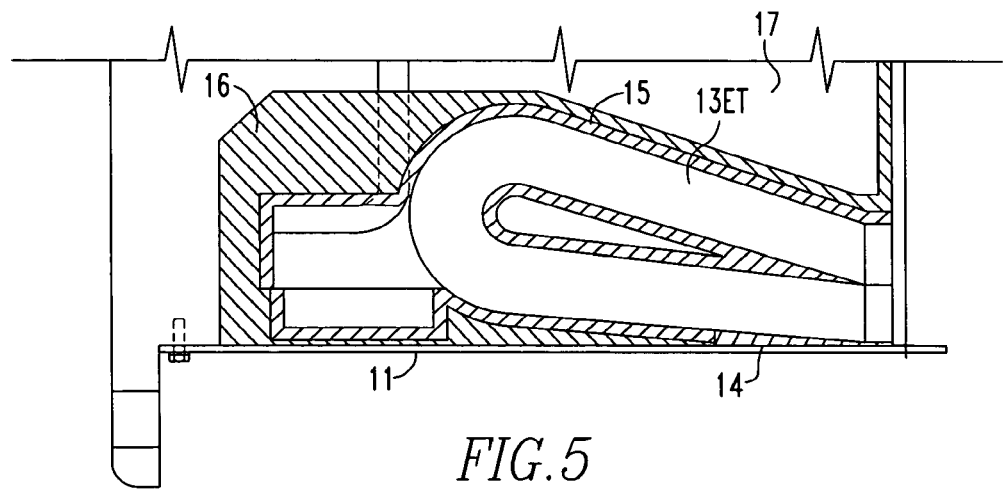
FIG. 5 shows an enlarged cross-sectional view of the stator coil end turns of FIG. 1 including the encapsulating layers.

FIGS. 1 to 5 are directed to a first embodiment in which the frame is manufactured as two castings. FIGS. 1 and 2 illustrate the assembled stator assembly 1 and rotor assembly 2. The stator assembly is illustrated in FIG. 3 and the rotor assembly in FIG. 4. The rotor assembly 2 consists of a conventional squirrel cage rotor characterized by an iron core 3 constructed of punched electrical grade steel laminations with either a brazed, welded, or cast copper or aluminum rotor cage 4. The rotor assembly 2 is attached to a steel shaft 5 which is supported on both ends with bearing assemblies 7 and 8. The bearing assemblies 7 and 8 are fit into bearing housings 9 and 10 which are designed to allow the rotor assembly 2 to be inserted through the cylindrical bore of the stator assembly 1. The stator assembly 1 includes a laminated iron core 12 that is totally enclosed by a frame 17 about its outer diameter and a canister seal 11 on its inner diameter. The laminated iron core 12 is constructed of punched electrical grade steel laminations, welded at the outside diameter to solidify the core (only exemplary laminates are illustrated in FIGS. 1 and 3). Winding coils 13 are inserted into slots in the iron core 12, connected and insulated. The canister seal 11 forms a cylinder covering the winding coils 13 placed into the slots punched in the iron core laminations. An electrically insulating silicone potting compound 14 (see FIG. 5) is poured into the pocket formed by the canister seal 11, the winding coils 13, and the laminated iron core 12. This compound seals the joint and provides corona discharge resistance between the coil windings and core. A flexible and compressible conformal coating 15 is applied to the winding coil extensions. The conformal coating 15 is a modified silicone, polyester, or epoxy product with additions to improve heat conductivity.

To allow assembly, the frame 17 is split into two sections 17A, 17B which are heated, bolted together while maintaining separation between the frame 17 and iron core 12, then allowed to cool and shrink around the iron core 12 and follows the contour of the winding coils. It is not necessary for the sections to be separate along a single diametrical plane. The canister seal 11 is then bolted to the frame 17. The resulting sealed assembly is subjected to a process which fills the voids at the coil end turns 13ET, the frame 17, the canister seal 11, and the iron core 12, with a modified thermosetting compound 16, including additions to improve thermal heat transfer. Bearing assemblies 7 and 8 and bearing housings 9 and 10 are added to the rotor assembly 2 and then rotor assembly 2 is dropped through the bore and bolted by bolts 32 to the frame 17 at each axial end. An external fan 23 with axial air passages 18 is shrunk onto the end of the shaft 5. The frame 17 has a plurality of radially extending fins 25. Air from the external fan 23 is directed axially over the fins with fan baffle 19 and through an axial passage 21 by the pressure developed by external fan 23.

The preferable solution for potting compound 14 is a silicone-based product that is pourable. Other embodiments of the present invention might use compounds based on epoxy, ceramics, or thermo-plastics. The characteristics important to the present invention are that the compound provide good dielectric properties and corona discharge resistance.

The preferable solution for conformal coating 15 is a silicone-based putty. Other embodiments of the present invention might use compounds based on epoxy, polyester, or ceramic materials, or the application of silicone tapes during coil forming. The characteristic important to the present invention is that the coating be flexible and expand and contract with the thermal expansion and contraction of the coils, yet bond well to the coil windings 13 and iron core 12.

There are many examples of thermosetting compounds 16. Among these are filled silicone resins, filled silicone gels, filled ceramics, filled thermo-plastics, and filled epoxies. The preferred fillers are mineral, glass, aluminum oxides, and metals. The properties important to the present invention are that the compound be free of voids or air pockets after filling, have good thermal conductivity, and bond well to the frame 17 and canister seal 11.

Examples of potting compounds 14, conformal coatings 15, and thermosetting compounds 16 could also be a single compound that is applied to all three locations and meets all the properties of the present invention.

The canister seal 11 may be a temporary fixture that is removed after thermoset compound 16 is applied and cured.

According to one embodiment of this invention, a frame 17 is made from two half castings 17A and 17B of nodular or spheroidal iron which are secured together at the edges parallel to the shaft by bolts to make a whole cylindrical frame.

Figure 7:
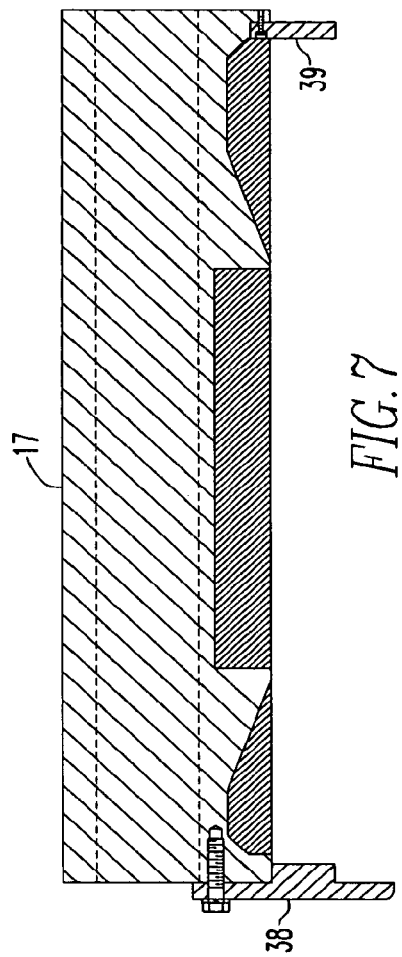
FIG. 7 is a section view taken along line VII-VII of FIG. 6.
Figure 6:
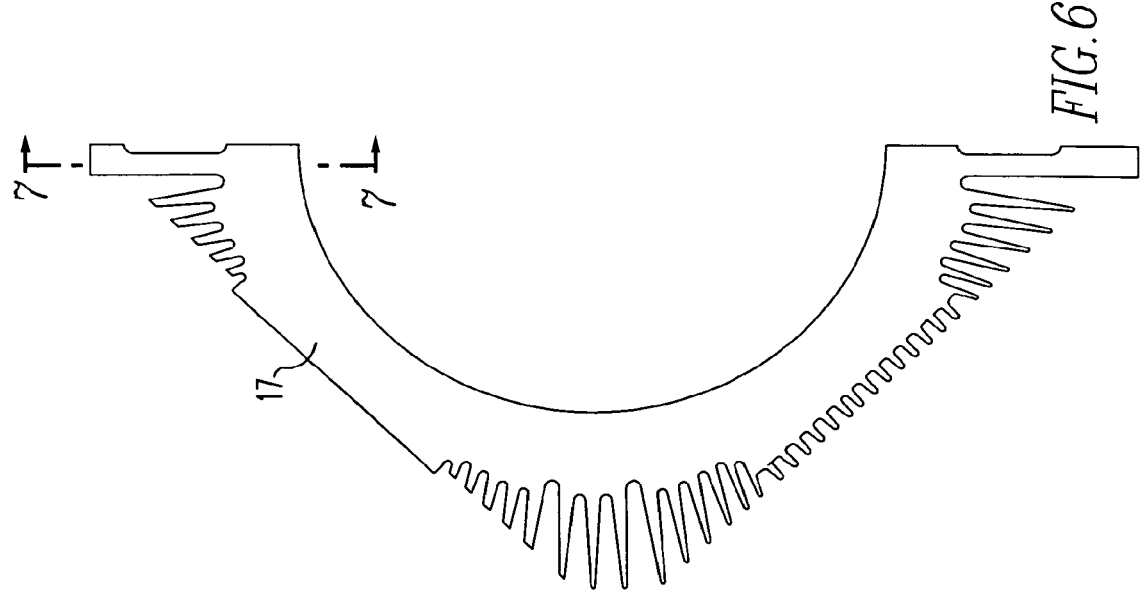
FIG. 6 is an end view of one side of a cast or extruded and machined split frame according to a second embodiment of this invention.

Referring to FIGS. 6 and 7, in a second embodiment of this invention, frame 17 is an extruded aluminum or iron half frame, machined after extrusion to accommodate the iron core 12 and coil windings 13. Frame 17 is extruded in two parts which are secured together at the edges parallel to the shaft by bolts to make a whole cylindrical frame. Two additional end housings machined from steel plate 38, 39 or cast nodular iron are used to complete the frame ends. Referring to FIG. 7, the closely hatched area is indicative of the volume that is machined away from the extrusion of casting.

Figure 8:
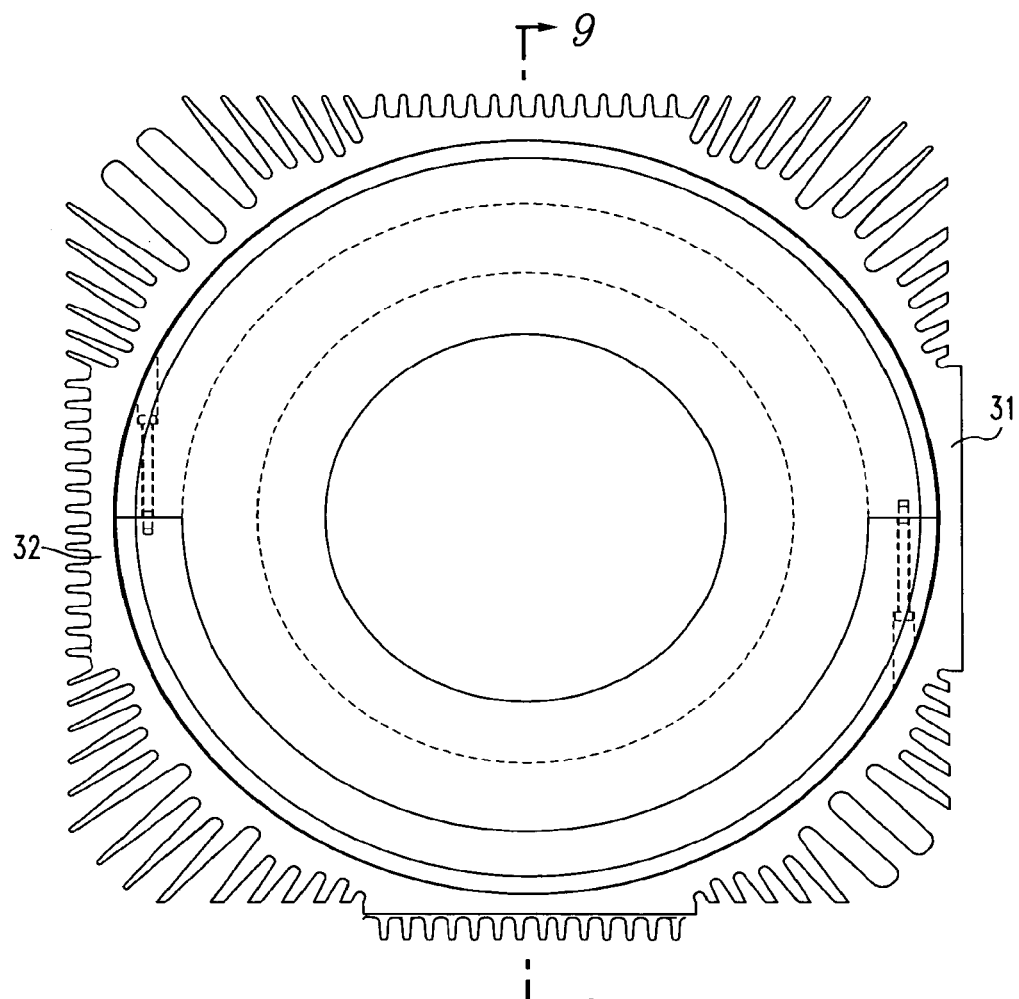
FIG. 8 is an end view of a cast and machined frame according to a third embodiment of this invention.
Figure 9:
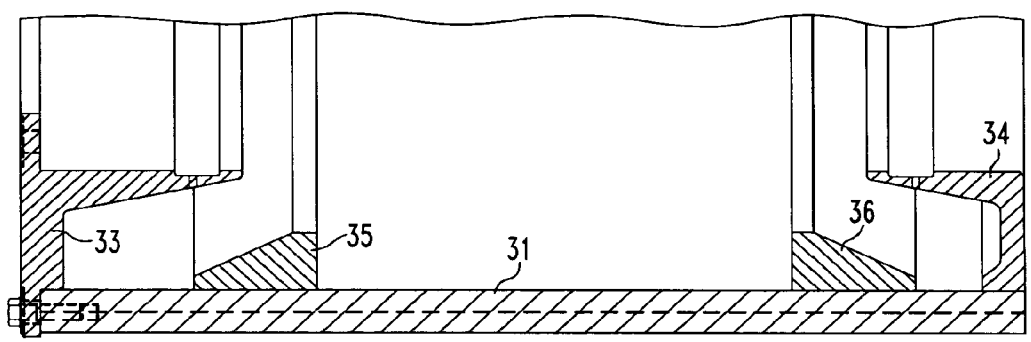
FIG. 9 is a broken away section view taken along line IX-IX of FIG. 8.
Figure 10:
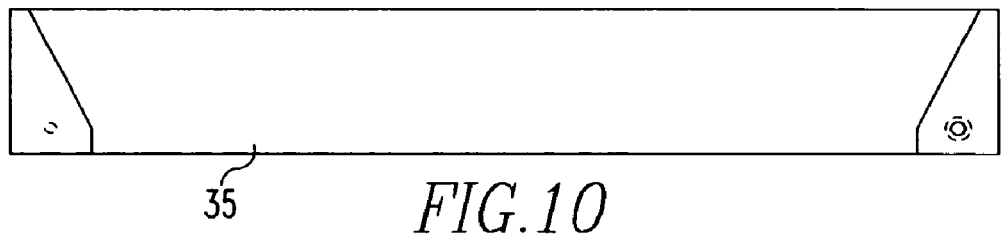
FIG. 10 is an end view of a split ring for use in the third embodiment.
Figure 11:
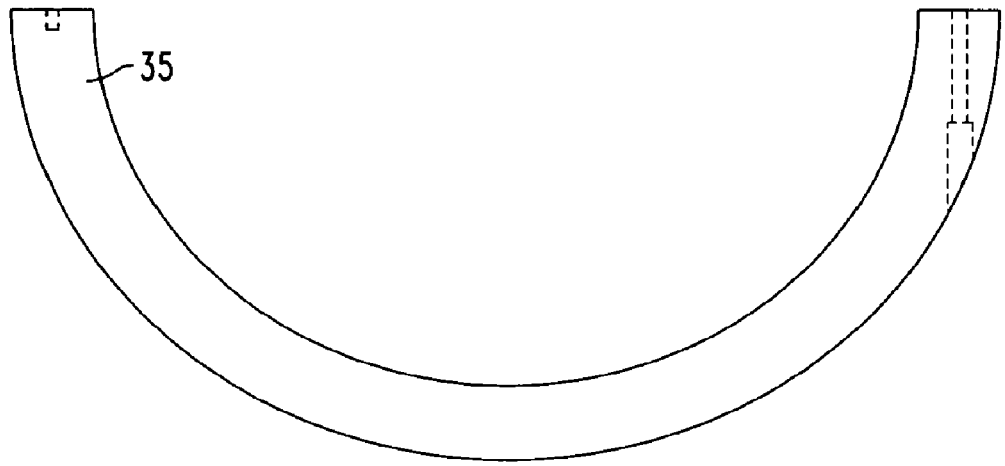
FIG. 11 is side view of the split ring of FIG. 10.
Figure 12:
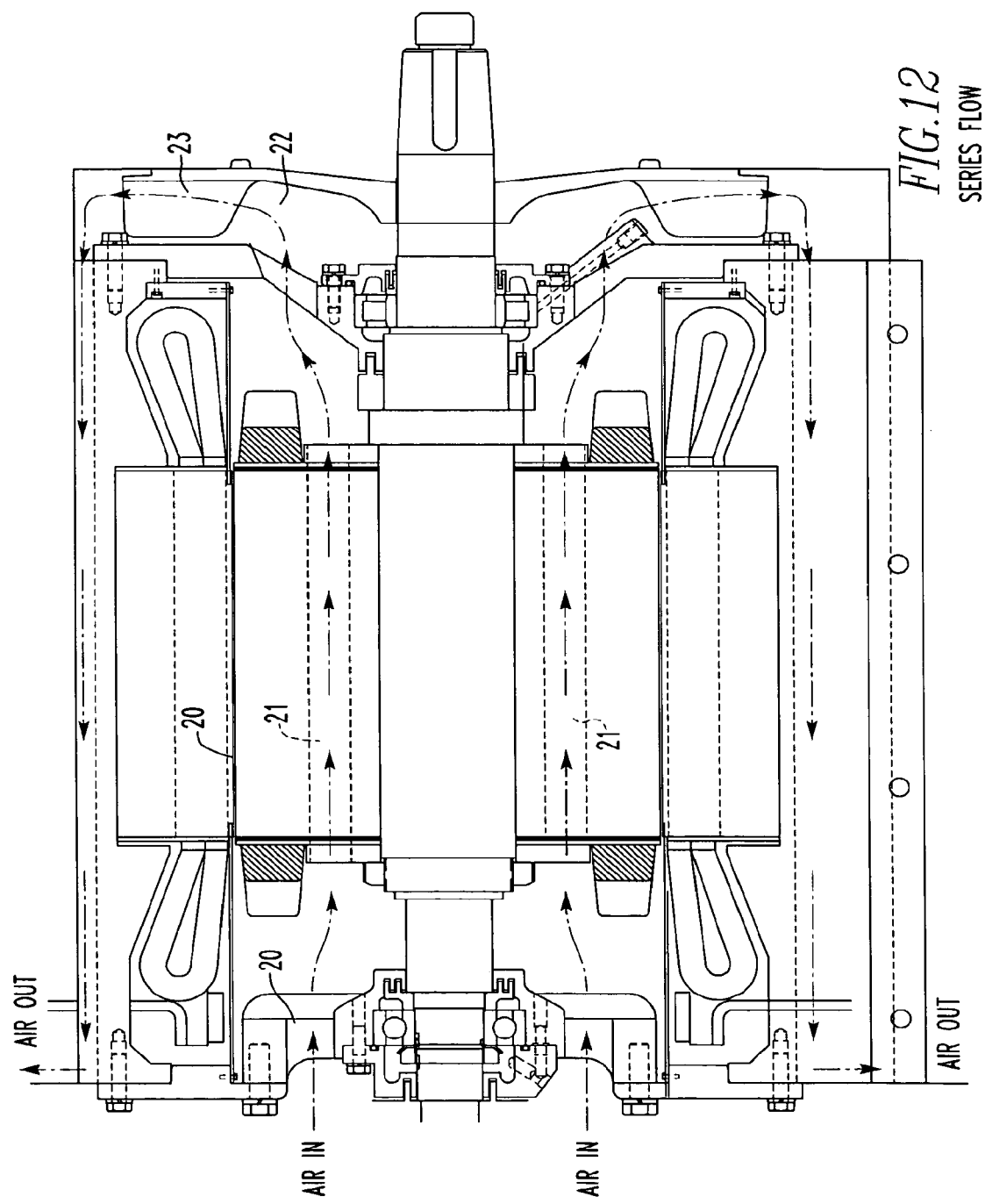
FIG. 12 shows a "Series Flow" ventilation embodiment.
Figure 13:
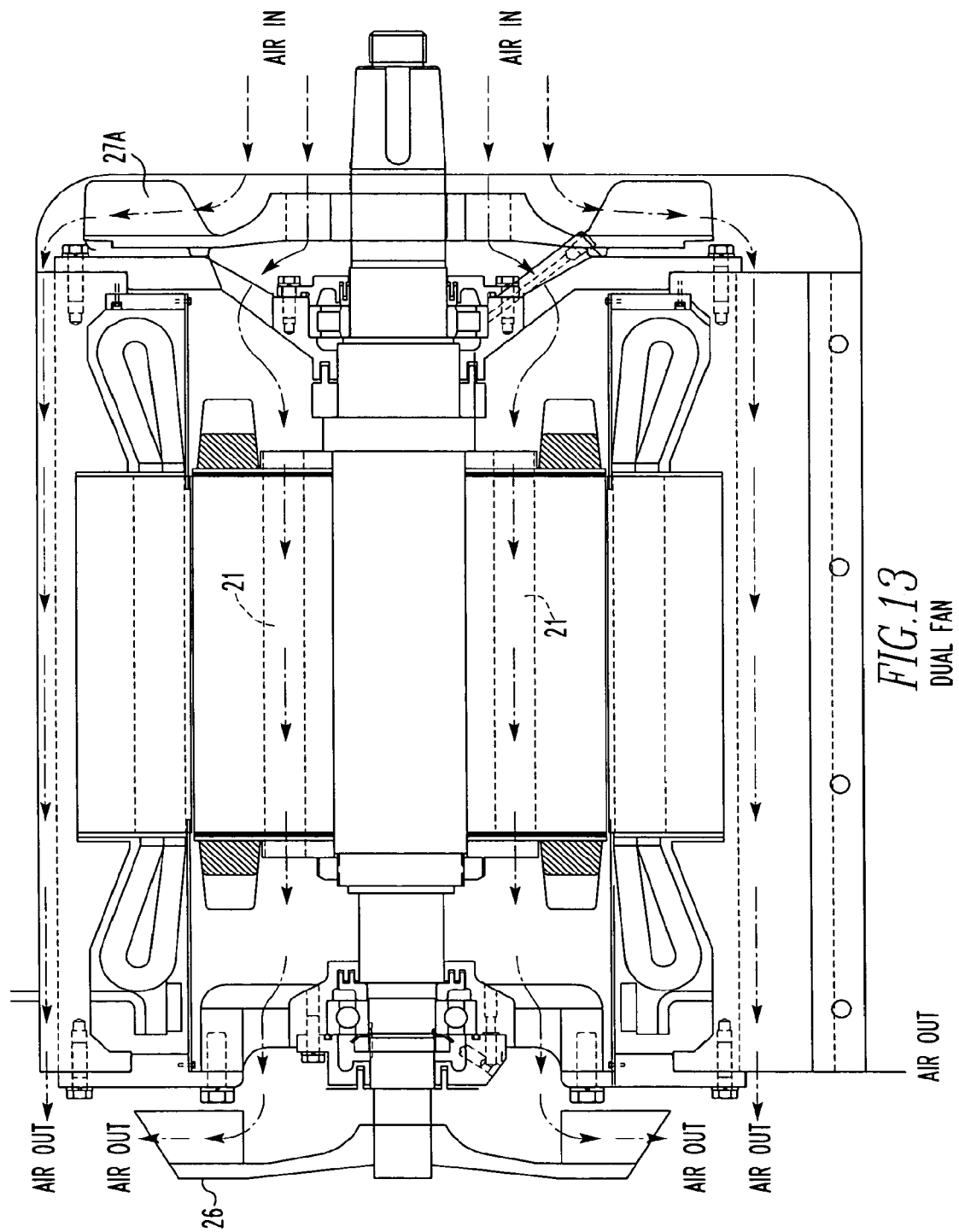
FIG. 13 shows a "Dual Fan" ventilation embodiment.
Figure 14:
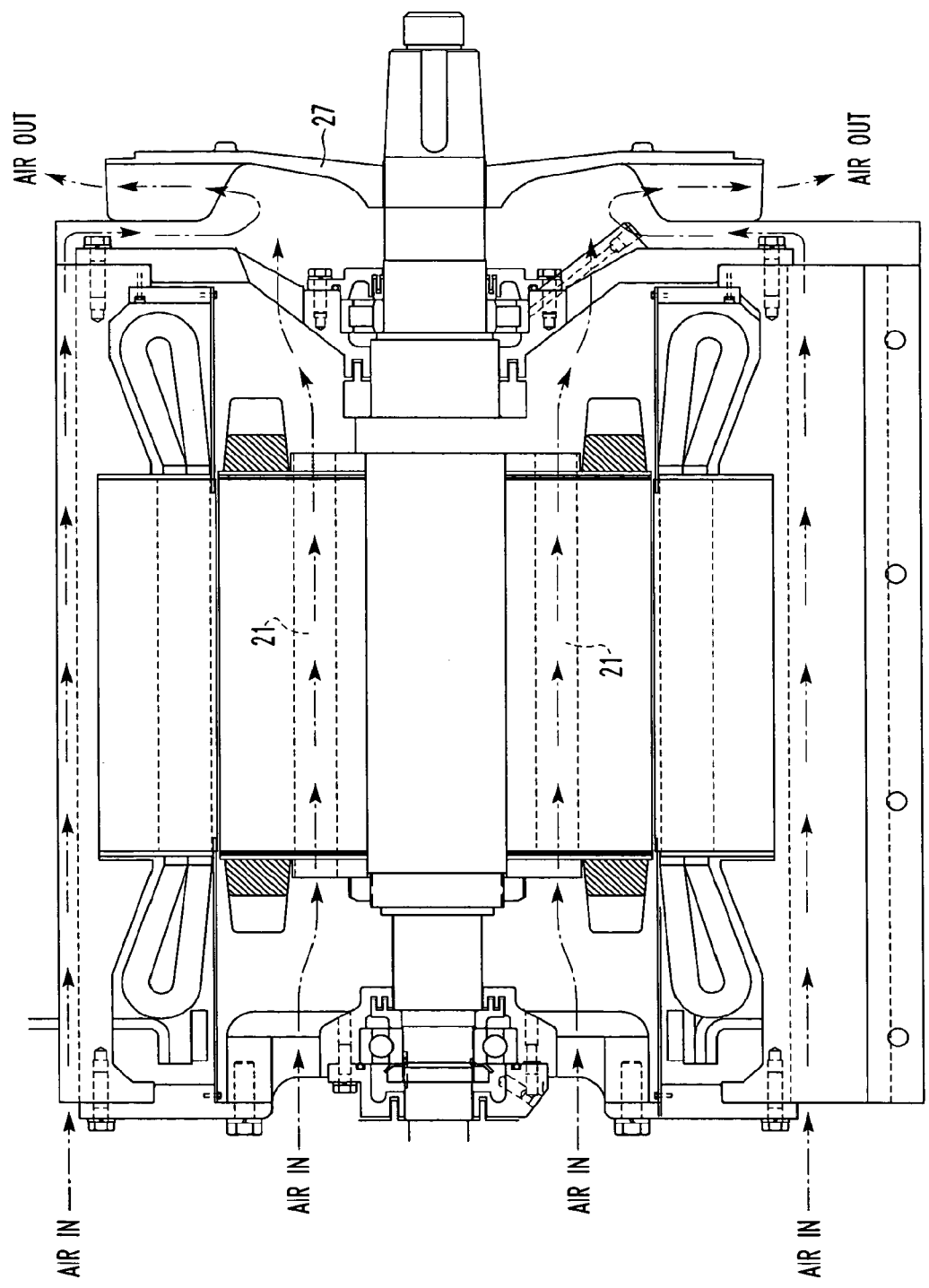
FIG. 14 shows a "Parallel Flow" ventilation embodiment.
Figure 15:
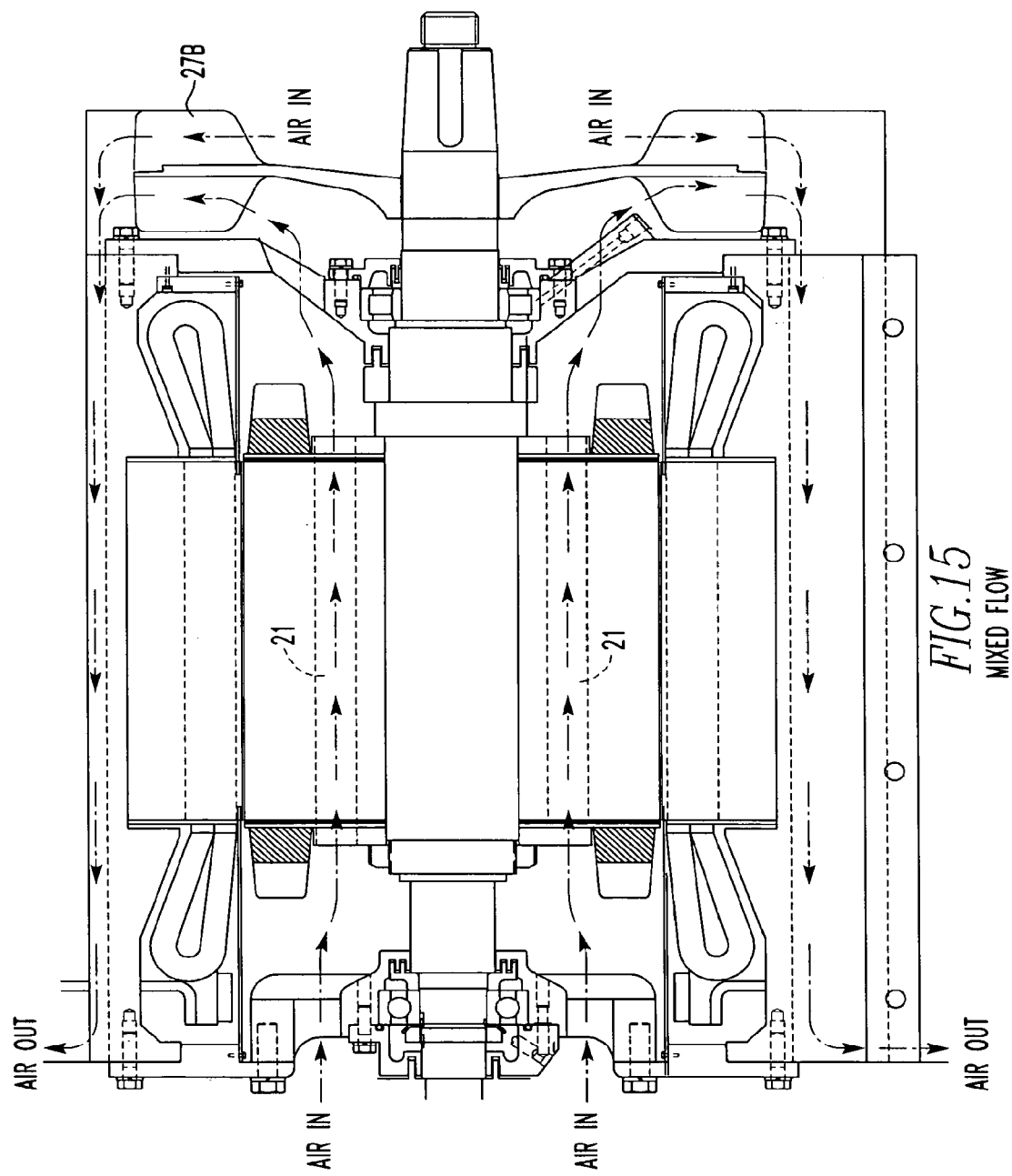
FIG. 15 shows a "Mixed Flow" ventilation embodiment.

FIGS. 8 to 11 relate to a third embodiment which comprises a frame, two end pieces, and two split rings which assembled together form a frame according to this invention. FIG. 8 is an end view of the cast frame 31 that requires little or no machining. FIG. 9 illustrates all pieces that comprise the assembled frame, the frame 31, end pieces 33, 34, and the split rings 35, 36. This third embodiment involves more parts than the first and second embodiments but has the advantage that it can be assembled without special machines and the split occurs in smaller end rings.

The preferred method of air cooling is a small internal fan 6 (see FIG. 4) to cool the rotor and an external fan 23 (see FIG. 1) to blow air over the fins 25 as shown in FIG. 2. There are other possible embodiments for air flow as depicted in FIGS. 12, 13, 14, and 15. "Series Air Flow", FIG. 12, requires one fan 23 that draws air through passage 20, rotor passage 21, and passage 22 and discharges it over the fins in the frame. Air inlets and air outlets are on the same end of the motor. "Dual Fan arrangement", FIG. 13, requires a fan on both ends. One fan 26A draws air through the rotor passage 21. The other fan 27A blows air over the fins in the frame. Air inlets are on the opposite end of the motor from the air outlets. "Parallel Flow", FIG. 14, requires one fan 27 drawing air from the fins in the frame and from the rotor passage 21 and then discharging the air to ambient. Air inlets are on the opposite end of the motor from the outlets. "Mixed Flow", FIG. 15, requires fan 27B with blades on both sides of a fan hub. The inside set of blades draws air from the rotor passage 21. The outside set of blades blows air over the fins in the frame after mixing with the rotor vent air. The air inlets and outlets are on the same end of the machine.

A die cast aluminum or brazed, welded, copper rotor is impervious to rain and snow ingestion. Enclosing it in the frame structure serves no beneficial purpose. By opening up the rotor to external air flow, rotor losses can be dissipated into the air stream directly from rotor surfaces, increasing heat dissipation efficiency. Air also will flow past the bearing housings keeping the bearings cool.

The ingestion of dust, dirt, or moisture to the stator coils can damage motor insulation. By encapsulating just the stator coils in an enclosed housing that completely surrounds the coils, a motor is realized with the sealed winding benefits of a standard TEFC motor, yet air can now flow over both the interior enclosure surfaces as well as the exterior enclosure surfaces, doubling the enclosure surface area available for heat dissipation. The encapsulation of the coils within a sealed enclosure that surrounds the coils seals the coil insulation from dirt and moisture.

The present invention may be realized by a cylindrical stator assembly, coaxial with the rotor assembly bolted to bearing housings. The rotor assembly is cooled by a small radial fan drawing air over the bearing housing, through axial air gaps or axial rotor vent holes, and discharging air through the opposing bearing housing. The stator parts are placed inside a cylindrical frame that surrounds the parts. The coils are encapsulated and molded into the frame structure using heat conductive compounds. A first heat conductive layer fills the gaps between coils and encases the coils in a flexible, heat conductive, electrically insulating, compound. The first layer is covered by a second layer that is a highly thermal conductive non-hygroscopic material. The second layer fills the internal air gap between the coils and enclosure with maximum contact pressure and fit to ensure good heat transfer into the enclosure walls. This structure increases the effective surface area of the coil end turns, increasing the heat transfer rate into the enclosure. The first layer is flexible to allow for movement and thermal expansion of the coil windings. The stator assembly has a plurality of fins extending radially from the frame. An external fan and fan shroud direct air through the fins. The hub of the external fan has air passages under the hub to allow air to enter the rotor assembly.

A feature of the present invention is obtaining a sealed stator enclosure with a good thermally conductive layer to allow heat from the coil end turns to flow directly into the enclosure walls rather than flowing back through the iron core. The heat transfer surface, the sum of the core to enclosure interface and the encapsulate to enclosure surface, needs to be large, in order to overcome thermal capacitance of the encapsulate.

A unique feature of the present invention is the selection of materials to achieve the required heat transfer rates to realize a motor with the same overall size as a self-cooled open ventilated motor. The use of an open rotor and sealed stator is unique to the transit industry. The joining of the first and second layers to allow for thermal expansion and mechanical movement of the coil end turns while maintaining long term heat transfer rates also has not been previously achieved.

Having thus described our invention with the detail and particularity required by the Patent Laws, what is desired protected by Letters Patent is set forth in the following claims.

The invention claimed is:

1. A partially enclosed induction motor comprising:
    a cylindrical metal rotor assembly comprising an integral shaft and squirrel cage, said rotor assembly having axial cooling air passages extending end to end;
    a stator assembly comprising a generally cylindrical laminated iron core with axial slots for receiving straight sections of stator windings, said stator windings having coil end turns extending axially beyond the laminated core;
    a metal frame defining a housing having a generally cylindrical shape with bearing housings mounted to the frame at each axial end such that bearings in the bearing housing support the shaft of the rotor assembly and establish the rotation axis of the rotor assembly, the interior of the frame configured to closely embrace the laminated core and follows the contour of the coil end turns of the stator assembly;
    a seal between the stator assembly and the rotor assembly for hermetically sealing the rotor assembly from the stator assembly;
    heat conductive molding material filling gaps in the stator winding and the space between the stator assembly and the frame;
    a fan driven by the rotor shaft; and
    a shroud for directing the air expelled by the fan along the canister seal and through the rotor assembly.

2. The partially enclosed induction motor according to claim 1 in which the metal frame has an approximately rotationally symmetric interior that closely embraces the laminated iron core and follows the contour of the windings.

3. The partially enclosed induction motor according to claim 1 in which the metal frame is formed as two shapes that when assembled together form the cylindrical metal frame.

4. The partially enclosed induction motor according to claim 1 in which the heat conductive molding material is a thermosetting resin with heat conductive filler.

5. The partially enclosed induction motor according to claim 1, wherein the molding material is comprised of a first non-flexible layer filling the gaps between and encasing the windings and a second non-hygroscopic layer.

6. The partially enclosed induction motor according to claim 1, wherein the molding material tightly packs the space between the stator assembly and the frame to assure maximum heat transfer.

7. The partially enclosed induction motor according to claim 1, wherein the metal frame has longitudinal and radial fins on the exterior surface.

8. The partially enclosed induction motor according to claim 1, wherein the metal frame is cast iron, steel or aluminum.

* * * * *